United States Patent [19]
Mottier et al.

[11] Patent Number: 5,542,103
[45] Date of Patent: Jul. 30, 1996

[54] RADIOTELEPHONE WITH EASILY ACCESSIBLE FEATURE ACTIVATION

[75] Inventors: Matthew D. Mottier, Palatine; Keith R. Manssen, Long Grove, both of Ill.

[73] Assignee: Motorola, Inc., Schaumburg, Ill.

[21] Appl. No.: 405,576

[22] Filed: Mar. 16, 1995

Related U.S. Application Data

[63] Continuation of Ser. No. 924,806, Aug. 4, 1992, abandoned.

[51] Int. Cl.$^6$ ........................................ H04B 1/40
[52] U.S. Cl. .................... 455/89; 379/59; 379/70
[58] Field of Search .................... 455/79, 89, 116, 455/234.2, 90; 381/42, 43, 107, 108, 109; 379/61, 63, 59, 68, 70

[56] References Cited

U.S. PATENT DOCUMENTS

| | | | |
|---|---|---|---|
| 4,385,204 | 5/1983 | Wine | 381/109 |
| 4,647,722 | 3/1987 | Nishida et al. | 455/89 |
| 4,716,576 | 12/1987 | Sakai et al. | 455/79 |
| 4,875,229 | 10/1989 | Palett et al. | 379/58 |
| 4,903,289 | 2/1990 | Hashimoto | 379/61 |
| 5,023,936 | 6/1991 | Szczutkowski et al. | 455/90 |
| 5,058,150 | 10/1991 | Kang | 379/58 |
| 5,073,928 | 12/1991 | Shimanuki | 379/70 |
| 5,201,068 | 4/1993 | Kawashima | 455/89 |

*Primary Examiner*—Reinhard J. Eisenzopf
*Assistant Examiner*—Nguyen Vo
*Attorney, Agent, or Firm*—Kenneth W. Bolvin; Donald C. Kordich

[57] ABSTRACT

The dual function switch of the present invention allows a radiotelephone user to enable or disable a feature of the radiotelephone while a call is being received and before it is answered. Before the call is received and after it is answered, the switch is a volume key. Otherwise, if the key is depressed twice (105), a feature or menu of features is displayed (109). When the call is answered, the displayed feature is activated (112).

6 Claims, 1 Drawing Sheet

RADIOTELEPHONE WITH EASILY ACCESSIBLE FEATURE ACTIVATION

This is a continuation of application Ser. No. 07/924,806, filed Aug. 4, 1992, and now abandoned.

FIELD OF THE INVENTION

The present invention relates generally to feature activation in an electronic device.

BACKGROUND OF THE INVENTION

Many cellular radiotelephones have an auto-answer feature that automatically answers an incoming call without activating the telephone's alert tone. The radiotelephone can then perform some predetermined task after answering such as receiving the voice or a dual tone multi-frequency (DTMF) message from the caller.

The auto-answer feature may be disabled when it is not needed and reenabled at a later time. The user may want to reenable the feature during an incoming call while in a situation where using the auto-answer feature is more convenient than actually receiving the call. This type of situation can occur at a location, such as a theater or court room, where the ringing of the telephone would annoy others. Once a call is being received, radiotelephone features cannot typically be changed. There is a resulting need for a way to quickly enable user features of a radiotelephone while an event, such as an incoming call, is occurring.

SUMMARY OF THE INVENTION

The process of the present invention encompasses a method for activation of a feature in a radiotelephone that has a switch and a plurality of features. The process first determines if a call is being received. If this is true, the process next determines if the switch is being activated. While the event is occurring, one of the features is enabled in response to the number of times the switch is activated.

DETAILED DESCRIPTION OF THE PREFERRED EMBODIMENT

The feature activation process of the present invention allows the user of a radiotelephone to quickly enable or disable one or more features when a call is received. By using a switch, subsequently referred to as a key, that is already present on the radiotelephone, extra keys on the keyboard are not required. This reduces the workload of a user who has to hunt through all the keys to find the proper one while the telephone is ringing. In the preferred embodiment, the volume keys are used.

Figure 2:
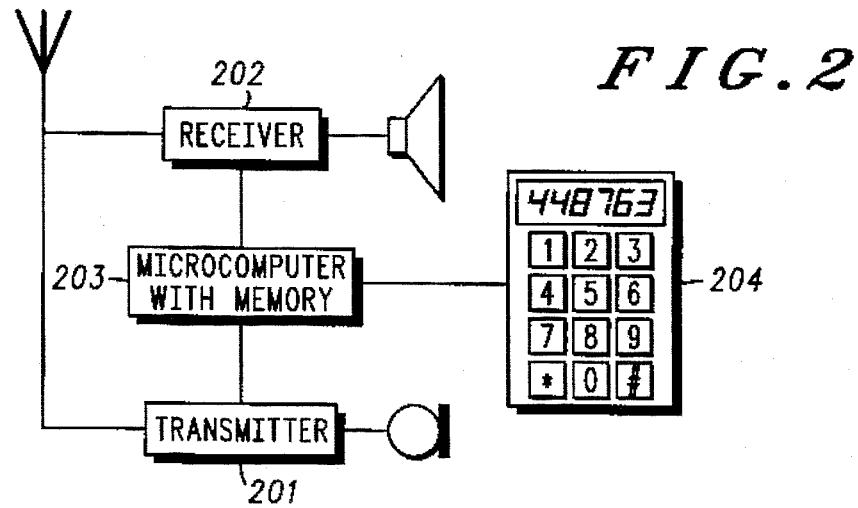
FIG. 2 shows a simple block diagram of a typical radiotelephone.

FIG. 2 illustrates a block diagram of a typical cellular telephone embodying the process of the present invention. The cellular telephone can be used in remote locations for providing cellular telephone service to subscribers who cannot obtain conventional landline telephone service.

The cellular telephone includes a transmitter (201), a receiver (202), and a microcomputer with memory (203) for controlling the operation of the radiotelephone. A display and keypad (204), comprised of a matrix of switches, enters and displays information.

Figure 1:
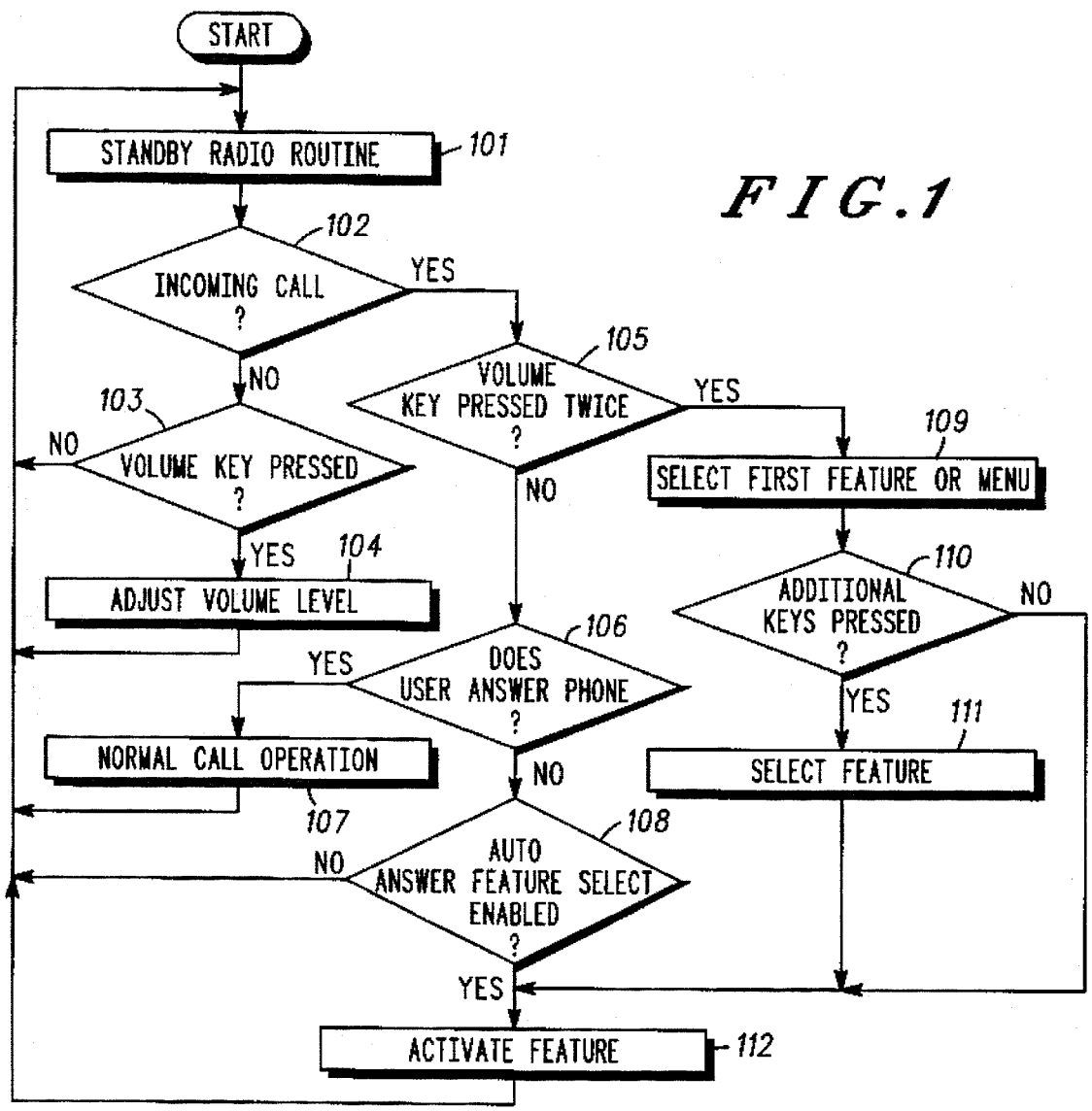
FIG. 1 shows a flowchart of the process of the present invention.

An example of a radiotelephone is described in Motorola instruction manual number 68P81054E60, *DYNATAC Cellular Mobile Telephone G-Series,* published by and available from Motorola C & E Parts, 1313 East Algonquin Road, Schaumburg, Ill. 60196. The microcomputer (203) performs the feature activation process of the present invention, illustrated in FIG. 1.

The process begins by the radiotelephone first performing the routines (101) normally done by a radiotelephone in a stand-by mode. The stand-by mode is the idle mode of the radiotelephone during which the radiotelephone is neither receiving nor transmitting calls. During this time, the radiotelephone may be registering with the base station of the cell in which it is located or simply checking for incoming calls (102).

If a volume key is depressed before a call is detected (103), the radiotelephone speaker volume is adjusted (104) depending on whether the up volume or down volume key was depressed. If the radiotelephone has only one volume key, the volume is adjusted in the opposite manner of its last adjustment; i.e., if the volume was increased on the last depression of the volume key, it will be decreased on this depression of the volume key.

If either volume key is depressed when a call has been detected but before it is answered, the process determines if the key has been depressed twice (105). If the key has only been depressed once and the user eventually answers the call (106), the process proceeds with normal operation of the radiotelephone (107). If the volume key has been depressed only once and the user does not answer the call (106), the process determines if the auto-answer feature was previously enabled (108). If auto-answer was not previously enabled, the key depression is ignored and the call is not answered. If auto-answer was previously enabled, auto-answer is activated and the call is answered (112).

If either volume key is depressed twice while a call is being received but before it is answered (105), the feature to be enabled is displayed (109). If the radiotelephone has a menu of features that can be enabled, the menu is displayed instead (109). This menu of features may include: auto answer DTMF input, auto-answer voice record, and auto-answer voice outgoing only.

If the volume key is not depressed after the feature or menu is displayed and before the call is answered (110), the feature in the display is activated when the call is answered (112). If the volume key is depressed additional times before the call is answered (110), a different feature from the menu will be selected for each depression of the key (111). When all the features of the menu have been selected and the volume key is depressed again, the first feature will again be selected and the list of features repeated for each subsequent depression.

In an alternate embodiment, the up volume key could be used to select the different features and the down volume key used to activate the selected feature or vice versa. An additional embodiment could use the up volume key to scroll through the feature list or menu in one direction and the down volume key to scroll in the opposite direction. Another embodiment could use one volume key to scroll through different menus and the other volume key to scroll through the particular features of the selected menu. The limiting factor in all the embodiments is that the selection must be accomplished before the call is answered.

We claim:

1. A method of activating at least one feature of a plurality of features of a handheld cellular radiotelephone, the handheld cellular radiotelephone including a first key and a second key located thereon, the method comprising the steps of:

receiving, by the handheld cellular radiotelephone, a call;

depressing, by the user, the first key a first predetermined number of times while the call is received and before the call is answered, thereby providing selection of the at least one feature, wherein depressing the first key a first predetermined number of times while the call is received and before the call is answered further includes the sub-steps of, depressing, by the user, the first key a second predetermined number of times while the call is received and before the call is answered, thereby providing display of at least one menu of the plurality of features, and after depressing the first key the second predetermined number of times, further depressing, by the user, the first key at least one additional time while the call is received and before the call is answered, thereby scrolling to the next feature of the menu for each additional key depression so that the last feature scrolled to is the selected at least one feature; and depressing, by the user, the second key while the call is received and before the call is answered, thereby providing activation of the at least one feature.

2. The method of claim 1 wherein the at least one feature is auto-answer.

3. The method of claim 2 further comprising the step of automatically answering the call by the radiotelephone.

4. The method of claim 1, wherein the first key is an up volume key and the second key is a down volume key.

5. A method of activating at least one feature of a handheld cellular radiotelephone, the handheld cellular radiotelephone including a key located thereon, the method comprising the steps of:

receiving, by the handheld cellular radiotelephone, a call;

depressing, by the user, the key a first predetermined number of times while the call is received and before the call is answered, thereby providing selection of the at least one feature, wherein depressing the key a first predetermined number of times while the call is received and before the call is answered further includes the sub-steps of, depressing, by the user, the key a second predetermined number of times while the call is received and before the call is answered, thereby providing display of at least one menu of the plurality of features, and after depressing the key the second predetermined number of times, further depressing, by the user, the key at least one additional time while the call is received and before the call is answered, thereby scrolling to the next feature of the menu for each additional key depression so that the last feature scrolled to is the selected at least one feature; and answering the call, thereby providing activation of the at least one feature.

6. The method of claim 5, wherein the key is a volume key.

* * * * *